Jan. 19, 1943.  R. A. GOEPFRICH  2,308,875
PISTON FOR WHEEL CYLINDERS AND THE LIKE
Filed May 15, 1941  2 Sheets-Sheet 1
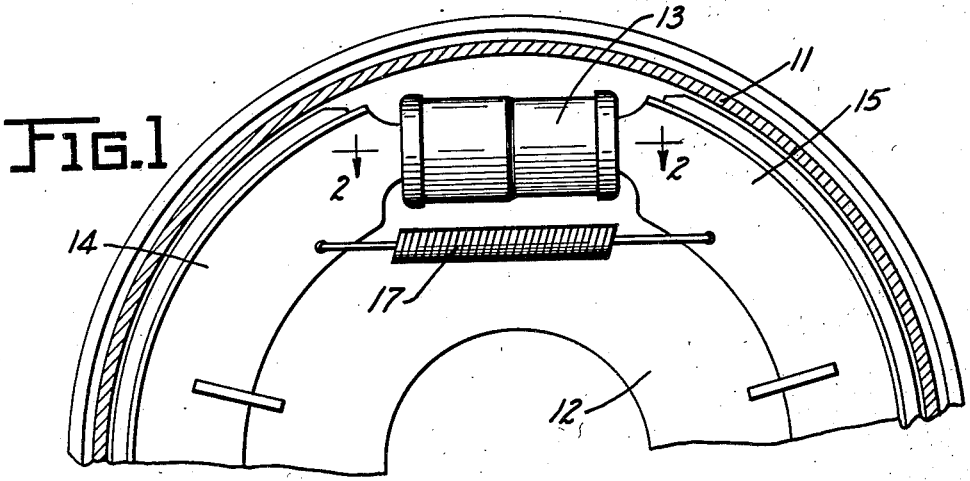
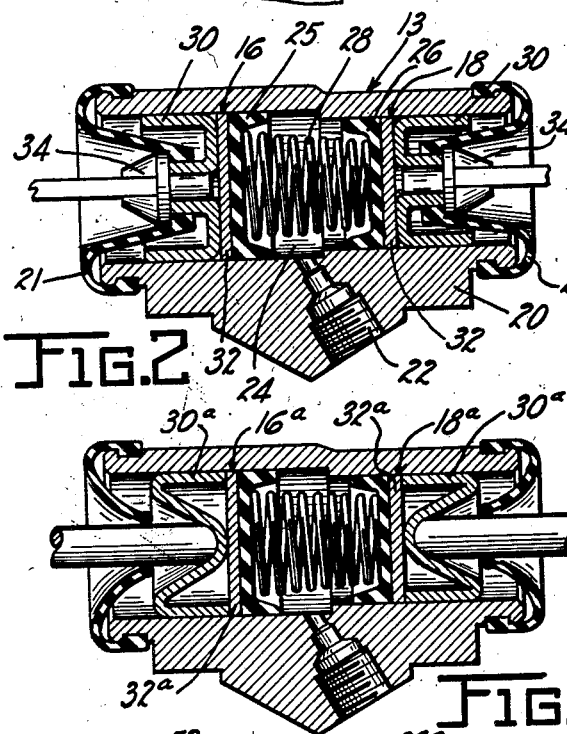
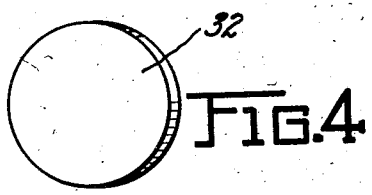
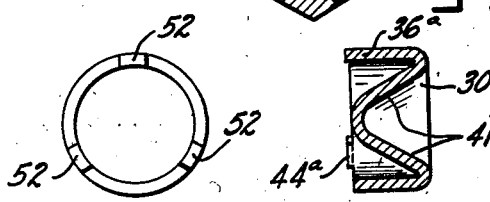
INVENTOR
RUDOLPH A. GOEPFRICH
BY M. D. McConkey
ATTORNEY

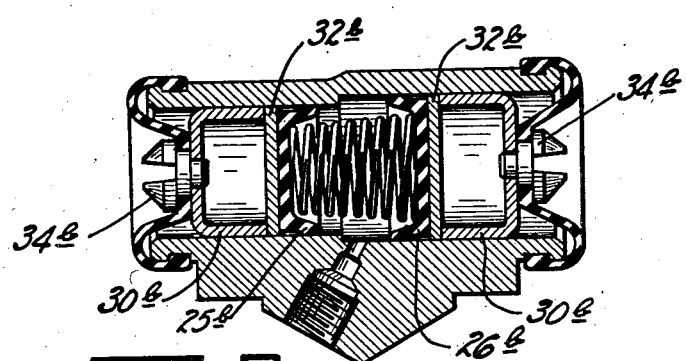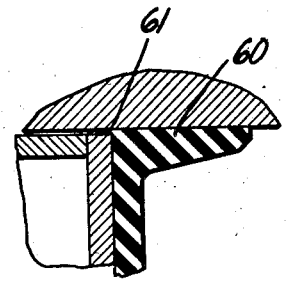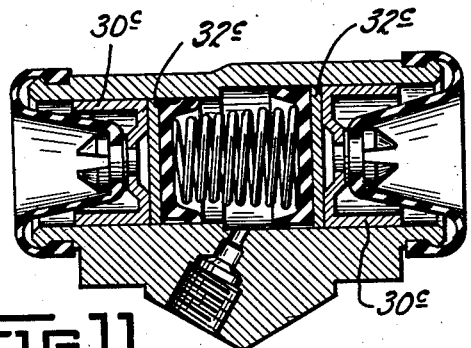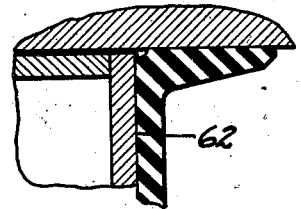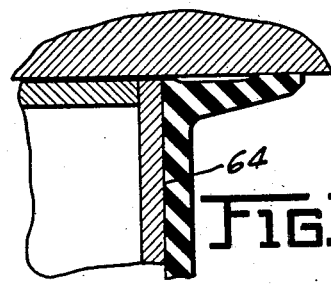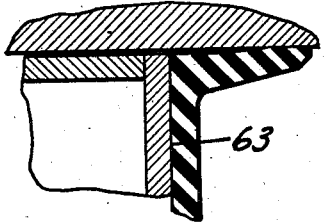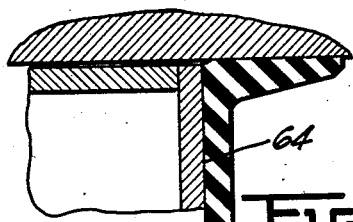

Patented Jan. 19, 1943

2,308,875

UNITED STATES PATENT OFFICE 2,308,875

PISTON FOR WHEEL CYLINDERS AND THE LIKE

Rudolph A. Goepfrich, South Bend, Ind., assignor to Bendix Aviation Corporation, South Bend, Ind., a corporation of Delaware Application May 15, 1941, Serial No. 393,647

5 Claims. (Cl. 309—4)

This invention relates to pistons or pressure transmitting devices for use in connection with hydraulic pressure transmission mechanism.

According to the present custom, pistons for use in hydraulic wheel cylinders and hydraulic master cylinders of the ordinary hydraulic brake systems are formed of aluminum, and the forming process consists in forging the metal to the desired shape and then grinding the outer surface of the piston to obtain a piston diameter which will conform closely to the inner diameter of the cylinder in which the piston is to be used. There is at present the possibility of scarcity of aluminum as a material for such use and it is therefore desirable to, wherever possible, substitute a more easily available and plentiful material.

It is therefore one object of my invention to provide a piston for use as described above which piston may be formed of a metal other than aluminum, preferably steel. This requires a different method for forming the piston, inasmuch as it is quite expensive and in some instances impracticable to use a forging process in making steel pistons.

It is a further object of this invention to find an inexpensive and yet entirely satisfactory process for making pistons for use as described above. I have, therefore, furnished a piston made entirely from stampings, preferably of steel. Inasmuch as stamping is one of the best ways, from a standpoint of both expense and satisfaction, for forming or shaping metal parts, it will be appreciated that my piston has definite advantages from a manufacturing standpoint.

Other objects and advantages of my invention will be apparent during the course of the following description wherein reference is made to the accompanying drawings:

Figure 1 is a section taken through a brake assembly just inside the head of a brake drum and showing brake shoes and an actuating cylinder in vertical elevation;

Figure 2 is a section taken through the hydraulic actuating cylinder on the line 2—2 of Figure 1;

Figures 3, 4 and 5 show in section or in perspective stampings which may be used in forming the pistons for the cylinder of Figure 2;

Figure 6 is a section taken through a hydraulic wheel cylinder and showing a piston device which is a modification of the piston device of Figure 2;

Figures 7 and 8 show in section component parts of the piston device of Figure 6;

Figure 9 is a section taken through a hydraulic wheel cylinder and showing a piston device which is a modification of the pistons of Figures 2 and 6;

Figure 10 shows the position of a flexible sealing cup of the type shown in Figure 9 when the brakes are in applied position and the surface of the sealing cup has not been bonded or vulcanized to the piston;

Figure 11 is a section taken through a hydraulic wheel cylinder and showing a piston device which is a modification of the pistons of Figures 2, 6 and 9;

Figure 12 is a partial section showing a sealing cup of the type shown in Figures 9 and 11 when the brakes are in applied position, the surface of the sealing cup being bonded or vulcanized to the piston disk;

Figure 13 shows a variation of the piston cup of Figures 10 and 12, the cup being shown as it appears when the brakes are released;

Figure 14 shows the sealing cup and piston of Figure 13 as they look when the brakes are in applied position;

Figure 15 shows a modification of the sealing cup of Figure 13, the cup being shown in brake released position; and Figure 16 shows the sealing cup of Figure 15 in brake applied position.

In Figure 1, I have shown a brake assembly comprising a drum 11, a backing plate 12, a hydraulic wheel cylinder 13 mounted on the backing plate, shoes 14 and 15 mounted on the backing plate and arranged to be spread by actuation of the hydraulic wheel cylinder, and a return spring 17 for normally holding the shoes in released position.

In Figure 2 is a sectional close-up of the hydraulic cylinder 13 which comprises a casing 20 having an inlet opening 22 connecting a hydraulic line (not shown) to a chamber 24 in the casing interior. A pair of piston devices or pressure-transmitting units indicated generally at 16 and 18 are reciprocable in the casing 20. Boots 21 and 23 which may be made of rubber are connected respectively to the piston devices 16 and 18 and are likewise connected to the sides of the casing 20 at opposite ends thereof, the said boots serving to prevent the entry of foreign material into the interior of the casing 20. At the inner ends of the piston devices 16 and 18 and facing toward the center of the chamber 24 are a pair of flexible sealing cups 25 and 26 which prevent the escape of hydraulic fluid from the chamber 24, said cups being yieldingly held against the faces of the respective piston devices 16 and 18 by a spring 28 compressed between the said cups. In applying the brakes in which the cylinder of Figure 2 is used, hydraulic fluid is forced through inlet 22 to chamber 24 and acts to spread apart the piston devices 16 and 18 which in turn exert a force on brake shoes 14 and 15, respectively, to apply the brakes.

Each of the piston devices of Figure 2 comprises a stamping 30 of the general shape shown in Figure 3, a stamping 32 of the general shape shown in Figure 4 and a thrust element 34 of the type shown in Figure 5. The stamping 30 has an annular shape with an outer cylindrical flange 36 adjacent the cylinder casing 20 and an inner cylindrical flange 38 which provides a circular opening 40 through the center of the annular stamping 30. The stamping 30 also has a substantially flat annular face 42 which is adapted to contact the disk shaped stamping 32. The stamping 30 may be welded to the stamping 32 and for this purpose I have shown a plurality of welding projections 44 on the surface 42 of the stamping 30. It is also possible to use the stampings 30 and 32 in the cylinder 10 without welding them together, i. e., with the disk loose in the interior of the casing 20. A further, and in some instances preferable, possibility for positioning the disk is vulcanization or bonding of the said disk 32 to the corresponding flexible cup 25 or 26 which is made of rubber or like material. The necessity for using both the stamped annular member 30 and the stamped disk 32 arises from the necessity for a flat surface against which the cups 25 and 26 may rest. As will be obvious to those skilled in the art, a stamping formed in the shape of the annular member 30 will almost invariably have a gently curving surface along lines where the stamping turns into a flange as indicated at 46 and will not have a sharp corner where the sides of the stamping are turned. It is desirable to have a sharp corner adjacent the bottoms of the cups 25 and 26 in order that proper support may be given to the bottom edges of the said cups. If such support is not given, there is always the danger that the cups will be pushed out of shape by the pressure of the fluid in the cylinder and that the edges of the cups will be pinched between the piston device and the cylinder wall. The thrust element 34 is pressed into the opening 40 formed in the center of the annular stamping 30 so that the stem of the thrust element extends into the opening 40 and the head of the thrust element rests against the edges of the circular flange 38. As shown the webs of the corresponding shoes rest in grooves in the heads of the thrust elements 34.

In Figure 6, the piston devices 16a and 18a each comprise a curved stamping 30a and a disk stamping 32a. The stamping 30a is formed with a cylindrical outer flange 36a, the edges of which contact the inside of the disk stamping 32a. The stamping 30a is curved inwardly as indicated at 41 to form a groove to accommodate one end of the web of a brake shoe. The stampings 30a and 32a may be secured together by projection welding as suggested in the modification of Figure 1 or, as in the said modification, the disk 32a may be loose in the casing 20 or may be vulcanized to the cups 25 and 26. In Figure 7, the stamping 30a is shown with a plurality of welding projections 44a. In Figure 8, the disk 32a is shown with a plurality of welding projections 52.

In Figures 9 and 11, I have disclosed two more modifications of my improved piston device. The pistons of Figure 9 each comprise a pair of stamped disks 32b and a pair of annular stampings 30b. The two stamped parts are preferably welded together to hold the assembly in proper position. Welding is not necessary, however, as the disk may be loose in the assembly or may be held in position by being vulcanized to a cup 25b or 26b. It will be noted that the stampings 30b are of a form which is particularly easy to make, the said stampings comprising simply a cup-shaped body with an opening to position the respective thrust transmitting member 34b. The pistons of Figure 11 are formed of disks 32c and stampings 30c. It will be noted that the sides or flanges of the stampings 30c extend outward in the direction of the brake shoes. It has been found that stampings of the type of those indicated at 30c are particularly strong and can withstand considerable pressure. As stated before the two stamped pieces in each piston may or may not be secured together and the disk may or may not be vulcanized to the sealing cup. The thrust elements are positioned by extending into openings in the stampings 30c.

It will be appreciated that I have provided a piston which may be readily and inexpensively formed and which permits the use of stampings as its component parts.

In Figures 10 and 12 to 16, inclusive, I have illustrated the advantages to be derived from vulcanizing a sealing cup to its associated piston. As shown in Figure 10, application of the brakes by hydraulic pressure exerts a force on the sealing cup tending to flatten the flange 60 against the cylinder wall and also tending to push the edge of the sealing cup as shown at 61 into any space which there may be between the outer edge of the piston and the cylinder wall. It is extremely hard to machine or otherwise prepare the piston and cylinder parts in such a manner that there will be no clearance between the piston and cylinder wall. While the sealing cup of Figure 10 is not secured or bonded in any manner to its piston, the sealing cup of Figure 12, similar in form to the sealing cup of Figure 10, is bonded to its piston along the surface 62. Figure 12 shows the position of the cup when the brakes are applied and shows how the vulcanizing or bonding of the sealing cup to the piston prevents the edge of the sealing cup from being caught and pinched between the cylinder wall and the piston. In Figure 13, I show in brake released position a piston sealing cup assembly in which the sealing cup is bonded to the piston along the surface 63. The same assembly is shown in Figure 14 with the brakes applied indicating again that vulcanization along the surface 63 prevents injurious effects to the sealing cup from having its edge caught between the piston and the cylinder wall. Again in Figures 15 and 16, I have illustrated the released and applied position respectively of a brake which has a slightly different type of sealing cup bonded to its piston along a surface 64.

It will be apparent that the bonding or vulcanizing of a sealing cup to its pistons will have several distinct advantages. First, it will tend to prevent injuries to the cup; second, it will, if used with a piston having disk-like parts 32, 32a, 32b and 32c, help to position the said disk; and, third, it will tend to lessen the cost of the operations which are used in forming the piston because the piston does not need to have such a close fit with the cylinder wall as is the case when the sealing cup is not bonded to the piston.

While various specific embodiments of my invention have been illustrated and described herein, it is my intention that the invention shall not be limited by the said illustrations or embodiments but shall be limited only by the terms of the appended claims.

I claim:

1. A thrust transmitting and sealing assembly for a hydraulic cylinder comprising a stamped disk, a stamped annulus secured to the disk and reciprocable within the cylinder, a sealing element bonded to the disk on the side opposite the annulus, and a thrust transmitting member pressed into and rigidly supported in the center of the annulus.

2. A piston assembly comprising a disk-shaped stamping, a second stamping bearing against the disk-shaped stamping having a substantially cylindrical outer flange and having an opening adjacent its center, and a thrust transmitting element having a body portion pressed into the opening in the second stamping and having a head portion resting against said second stamping.

3. For use in a hydraulic cylinder, a piston comprising a stamped disk, a stamped annulus bearing against the disk having an opening through the center thereof and having a substantially cylindrical outer flange slidingly engaging the inner wall of the cylinder, and a thrust transmitting member having a body portion pressed into the opening in the annulus and having a head portion resting against the annulus, said head portion having a slot to receive one end of a force transmitting web.

4. A piston comprising a substantially flat disk stamping having its outer circumferential surface slidingly engaging the inner wall of a cylinder, and a hollow stamping having its side walls fashioned for engagement with the cylinder wall and having its center depressed to provide a socket for receiving one end of a force transmitting operating rod, the cylindrical side walls of the hollow stamping having their annular end surface bearing against the face of the disk.

5. A piston comprising a substantially flat disk stamping having an outer circumferential surface slidingly engaging the inner wall of a cylinder, a hollow stamping having its side wall fashioned for engagement with the cylinder wall and having its center depressed to provide a socket for receiving one end of a force transmitting operating rod, and a weld between the annular end surface of the cylindrical side wall of the hollow stamping and the face of the disk for securing the hollow stamping to the disk.

RUDOLPH A. GOEPFRICH.